United States Patent [19]
Rabe et al.

[11] Patent Number: 6,138,010
[45] Date of Patent: Oct. 24, 2000

[54] MULTIMODE COMMUNICATION DEVICE AND METHOD FOR OPERATING A MULTIMODE COMMUNICATION DEVICE

[75] Inventors: Duane C. Rabe, Hawthorn Woods; William P. Alberth, Jr., Crystal Lake; John G. Rauch, Chicago, all of Ill.

[73] Assignee: Motorola, Inc., Schaumburg, Ill.

[21] Appl. No.: 08/848,417

[22] Filed: May 8, 1997

[51] Int. Cl.[7] .................................................. H04Q 7/20
[52] U.S. Cl. ............................................ 455/426; 455/553
[58] Field of Search .................................. 455/553, 552, 455/422, 432, 436, 550, 575, 90, 403, 343, 38.3, 574, 426

[56] References Cited

U.S. PATENT DOCUMENTS

| | | |
|---|---|---|
| 4,972,455 | 11/1990 | Phillips et al. ............................. 379/59 |
| 5,020,093 | 5/1991 | Pireh ......................................... 379/59 |
| 5,073,900 | 12/1991 | Mallinckrodt ........................... 455/33.1 |
| 5,260,988 | 11/1993 | Schellinger .............................. 379/59 |
| 5,367,558 | 11/1994 | Gillig et al. ............................. 379/59 |
| 5,428,666 | 6/1995 | Fyfe et al. ............................... 455/551 |
| 5,442,680 | 8/1995 | Schellinger et al. .................... 455/553 |
| 5,463,674 | 10/1995 | Gillig et al. ............................. 455/553 |
| 5,517,679 | 5/1996 | Yahagi ..................................... 455/343 |
| 5,533,099 | 7/1996 | Byrne ....................................... 379/58 |
| 5,535,207 | 7/1996 | Dupont .................................... 455/38.3 |
| 5,535,430 | 7/1996 | Aoki et al. . | 
| 5,535,432 | 7/1996 | Dent ......................................... 455/552 |
| 5,594,782 | 1/1997 | Zicker et al. ............................ 379/63 |
| 5,625,874 | 4/1997 | Uchida et al. ........................... 455/33.2 |
| 5,697,081 | 12/1997 | Layall, Jr. et al. ..................... 455/234.1 |
| 5,873,033 | 2/1999 | Hjern et al. ............................. 455/426 |

FOREIGN PATENT DOCUMENTS

| | | |
|---|---|---|
| 0 521 609 A2 | 1/1993 | European Pat. Off. . |
| 0660626 A2 | 6/1995 | European Pat. Off. . |
| 2 320 658A | 6/1998 | United Kingdom ............. H04Q 7/32 |
| WO 90/13211 A1 | 11/1990 | WIPO . |
| WO 94/26055 | 11/1994 | WIPO .......................... H04M 11/00 |
| WO 96/08878 | 3/1996 | WIPO .............................. H04B 1/38 |
| WO 97/05753 | 2/1997 | WIPO . |
| WO 97/08883 A1 | 3/1997 | WIPO . |
| WO 97/50269 | 12/1997 | WIPO .............................. H04Q 7/32 |
| WO 98/07264 | 2/1998 | WIPO . |
| WO 98/07364 | 2/1998 | WIPO .............................. A61B 5/00 |

OTHER PUBLICATIONS

Motorola Satellite Communication, Inc. "Iridium, low earth orbit mobile satellite system", Dec. 1990.

"Ready to Roam", *Iridium Today*, Spring 1997, pp. 14–20.

*Primary Examiner*—Nguyen Vo
*Attorney, Agent, or Firm*—John G. Rauch; Lalita P. Williams

[57] ABSTRACT

A method and communication device (102) provide multimode communication with multiple autonomous communication systems including a first communication system (104) and a second communication system (106). Resources are dedicated to communication on the respective communication systems. To minimize product cost, resources are shared wherever possible between communication on respective modes. A system supervisor (304) prioritizes, schedules and controls communication between the communication device and the autonomous communication systems.

1 Claim, 6 Drawing Sheets

MULTIMODE COMMUNICATION DEVICE AND METHOD FOR OPERATING A MULTIMODE COMMUNICATION DEVICE

FIELD OF THE INVENTION

The present invention generally relates to communication devices. More particularly, the present invention relates to multimode communication devices and methods for operating such communication devices.

BACKGROUND OF THE INVENTION

Multimode communication devices are communication devices configured for communication such as radio communication in more than one communication mode. For example, such modes of communication include digital and analog signaling, different frequency bands for communication, and communication according to different communication protocols. Examples of such protocols are Advanced Mobile Telephone Service (AMPS), North American Digital Cellular service according to J-STD-009, PCS IS-136 Based Mobile Station Minimum Performance 1900 MHz Standard and J-STD-010, PCS IS-136 Based Base Station Minimum Performance 1900 MHz Standard ("IS-136"); Code Division Multiple Access (CDMA) radiotelephone service according to EIA/TIA interim standard 95 Mobile Station-Base Station Compatibility Standard for Dual-Mode Wideband Spread Spectrum Cellular System ("IS-95"); Global System for Mobile Communication ("GSM"); and satellite protocols such as that proposed by Iridium, L.L.C. ("Iridium;" Iridium® is a trademark and service mark of Iridium, L.L.C.). A typical communication system provides communication in one of these modes in a limited geographical area. A multimode communication device may use one or more of these modes for communication.

Existing multimode radiotelephones include some cellular telephones. For example, cellular phones according to IS-136 and IS-95 are operable in both an analog mode and a digital mode. Cellular phones according to IS-136 are dual band communication devices in that they operate in a first band of frequencies near 800 MHz and a second band of frequencies around 1900 MHz. Such radiotelephones communicate with a single type of communication system in different modes.

Such previous radiotelephones are constrained by the limited geographic coverage of the system. When the radiotelephone is moved to a new area beyond the system's boundaries, service on the radiotelephone is no longer available. Even though other systems provide service in the new area, unless that service is compatible with the radiotelephone, the radiotelephone can't communicate with the system. Further, service on a system may not be available for a time. Even though other (incompatible) systems provide service to the same area, the radiotelephone is not usable.

A new type of radiotelephone is envisioned which can operate on autonomous communication systems. Autonomous communication systems are communication systems which are independent but may overlap in their geographical coverage areas. Thus, in a particular area, a radiotelephone of this new type may communicate with a terrestrial system such as a GSM system and with a satellite system such as an Iridium system. In a different area, the radiotelephone may communicate with a GSM system and an IS-95 system.

Communication with multiple autonomous communication systems differs from conventional communication with a single system that has multiple modes. In such systems, a mobile station such as a radiotelephone communicates with multiple fixed base stations in the communication system. The base stations, in turn communicate with a network controller or mobile telephone switching office which coordinates the system and provides handoff of communications from base to base and from mode to mode. In autonomous communication systems, the respective systems are autonomous in that there is little or no intercommunication between the two systems. Handoff is not possible between systems. A mobile station for use in multimode communication with autonomous systems must adapt to these limitations.

Moreover, there is a constant desire in the field of communication devices to minimize the product cost of such devices. One common way to reduce product cost is to eliminate duplicate components by re-using a single component in different applications. For example, in dual mode radios according to IS-136 and IS-95, it is known to use a single antenna for both the analog and digital modes of operation. Other shared hardware resources include voltage controlled oscillators and other frequency synthesizer components, digital signal processors and permission to receive and transmit. To be economically viable, future multimode communication devices will need to exploit this concept of shared resources while still being able to communicate with multiple autonomous systems.

Accordingly, there is a need in the art for a multimode communication device and a method for operating such a device which solves these problems.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
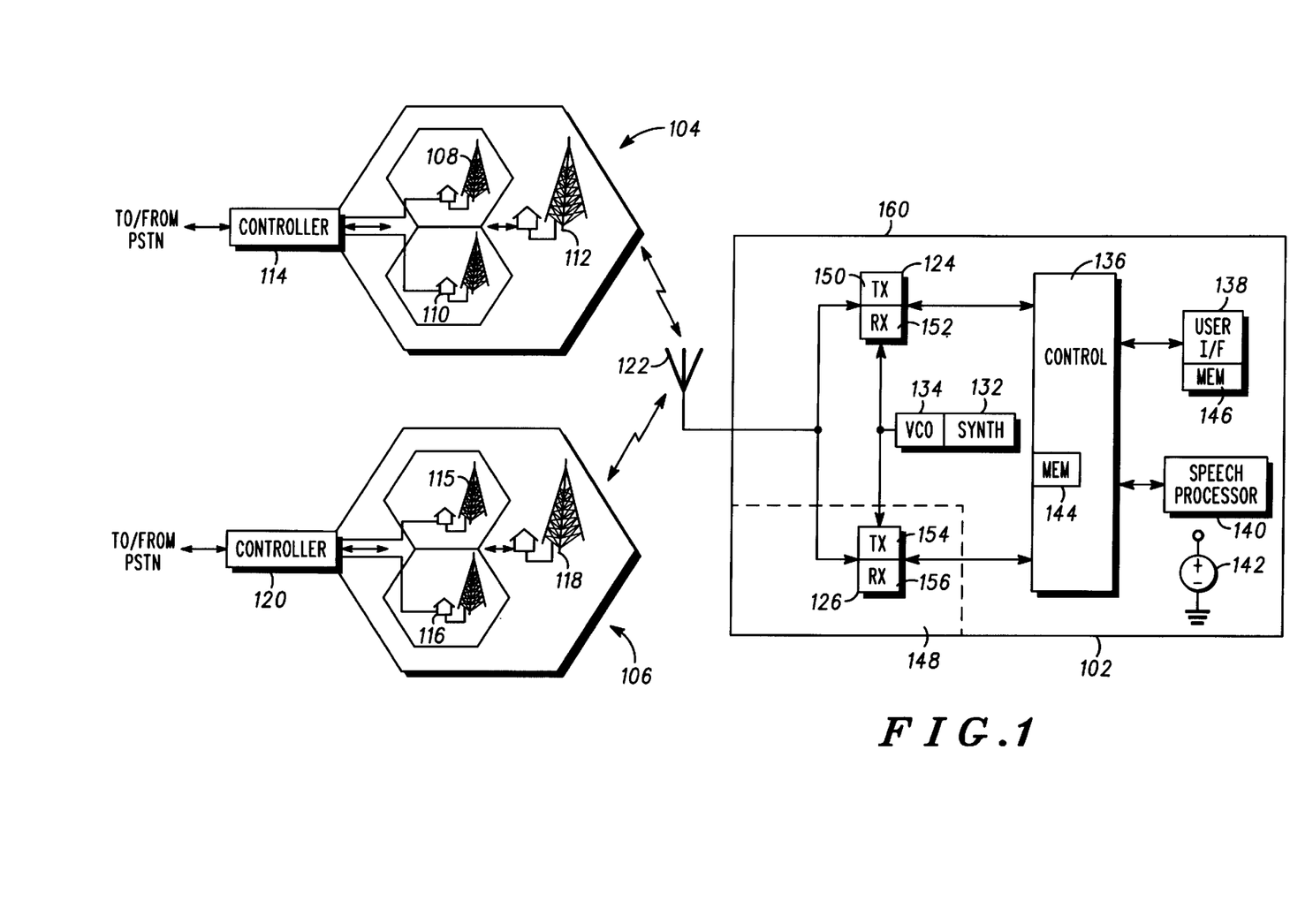
FIG. 1 is a block diagram of a communication device and a plurality of communication systems.

Referring now to FIG. 1, a communication device 102 is operable on a plurality of communication systems, including a first communication system 104 and a second communication system 106. In the illustrated embodiment, the first communication system 104 includes a first base station 108, a second base station 110, a third base station 112 and a network controller 114. The second communication system 106 similarly includes a first base station 115, a second base station 116, a third base station 118 and system controller 120. Each base station in each communication system provides radio communication with mobile stations such as the communication device 102 in a fixed geographic area adjacent the base station. The network controller in each communication system controls communication between mobile stations and the base stations of the communication system and provides a communication link to the public switched telephone network (PSTN).

In the illustrated embodiment, the second communication system 106 is autonomous from the first communication system 104. The communication systems are autonomous in that they are independent of each other. For example, there is little or no communication between the communication systems and their timing is not synchronized. There is no provision for handoff between the two communication systems. Each system has no knowledge of the other system. The communication device 102 communicates independently with each system.

While two communication systems are illustrated in FIG. 1, there may be any number of communication systems serving the geographical area where the communication device 102 is located. These may include satellite communication systems, such as the Iridium system, and terrestrial systems such as AMPS systems, GSM systems, IS-136 systems, IS-95 systems and others. Also, the communication systems may operate at different frequency ranges, such as GSM at 900 MHz and GSM at 1800 MHz. Also, while the first communication system 104 and the second communication system 106 are illustrated as terrestrial systems, it is understood that either or both may be satellite systems, with orbiting or geosynchronous satellites performing the function of base stations.

The communication device 102 includes an antenna 122, a first transceiver 124, a second transceiver 126, a synthesizer 132 including a voltage controlled oscillator 134, a controller 136 including memory 144, a user interface 138 including memory 146, a speech processor 140 and a battery 142. The components of the communication device 102 are contained in a housing 160.

In the illustrated embodiment, the communication device is a portable multimode radiotelephone operable on a plurality of communication systems including the first communication system 104 and the second communication system 106. A first mode of operation corresponds to operation on a first radiotelephone system and a second mode of operation corresponds to operation on a second radiotelephone system. Alternatively, the first mode of operation corresponds to operation in a first frequency range and the second mode of operation corresponds to operation in a second frequency range.

The first transceiver 124 generally includes a transmitter 150 and a receiver 152 coupled to the antenna 122 for radio communication with the first communication system 104 of the plurality of communication systems. The first transceiver 124 includes hardware and software elements tailored for operation according to the communication protocol (AMPS, GSM, IS-136, IS-95, Iridium, etc.) used by the first communication system 104 and at the frequency band (e.g., 800 MHz, 1900 MHz, etc.) used by the first communication system 104. The first transceiver 124 may also include a microcontroller or other processor and stored program instructions. Implementation of such a transceiver may be readily accomplished using known techniques. The first transceiver 124 thus provides first resources for operating the communication device 102 according to a first mode.

Similarly, the second transceiver 126 includes a transmitter 154 and a receiver 156 coupled to the antenna 122 for radio communication with the second communication system 106 of the plurality of communication systems. The second transceiver 126 includes hardware and software elements tailored for operation according to the communication protocol used by the second communication system 106 and at the frequency band used by the second communication system 106. The second transceiver 126 may also include a microcontroller or other processor for operating in response to stored program instructions. The second transceiver 126 thus provides second resources for operating the communication device 102 according to a second mode, the second mode being autonomous from the first mode.

The synthesizer 132 generates oscillating signals necessary to the operation of the first transceiver 124 and the second transceiver 126. The oscillating signals are modulated in the transmitter 150 of the first transceiver 124 and the transmitter 154 of the second transceiver 126 to transmit information to the first communication system 104 and the second communication system 106, respectively. The oscillating signals may be warped to tune the transceivers to particular channels within their assigned frequency bands. Multiple voltage controlled oscillators such as VCO 134 may be used, especially where the multimode capability of the communication device 102 includes dual band or other multiband operation.

The controller 136 controls operation of the communication device 102. The controller 136 may be implemented, for example, as a microcontroller operable in response to program instructions stored in the memory 144. Program instructions may be stored in other locations accessible by the controller, such as the first transceiver 124 and the second transceiver 126 and the memory 146 of the user interface 138.

The user interface 138 includes hardware and software elements required for operation and control of the communication device 102 by a user. Examples include a data interface for exchanging data with other equipment, a keypad, a display, a microphone and a speaker or earpiece. The user interface 138 also includes software for controlling the hardware elements, stored in the memory 146.

The speech processor 140 includes a speech processing circuit and software for processing speech. Speech received at the microphone of the user interface 138 is processed, for example by digital encoding and conveyed to the transmitter 150 of the first transceiver 124 or the transmitter 154 of the second transceiver 126 for transmission in accordance with the communication protocol of the respective communication system. Similarly, encoded speech received by the receiver 152 of the first transceiver 124 or the receiver 156 of the second transceiver 126 is processed in the speech processor 140 to extract the speech conveyed from the communication system. The speech is then provided to the speaker of the user interface or to other destinations (such as memory for storing a voice mail message) in the communication device 102.

In accordance with the present invention, the antenna 122, the synthesizer 132, the VCO 134, the user interface 138, the speech processor 140 and the battery 142 form shared resources required for operating the communication device 102 in conjunction with the first resources (i.e., the first transceiver 124) according to the first mode and the second resources (i.e., the second transceiver 126) according to the second mode. Portions of the first transceiver 124 and the second transceiver 126 may be combined to form additional shared resources. The two transceivers may be fully combined as a shared resource. The controller 136 forms a resource manager for selectively assigning the shared resources in response to operation of the communication device 102 according to the first mode and according to the second mode.

In one exemplary embodiment, the communication device 102 comprises a radiotelephone and the first resources include a first communication circuit, first transceiver 124, for radio communication with a first remote transceiver, such as base station 112, in a first communication system 104. The second resources include a second communication circuit, second transceiver 126, for radio communication with a second remote transceiver, such as base station 118 in a second communication system 106.

In the illustrated embodiment, the second transceiver 126 is contained in a detachable module 148. The detachable module 148 may be detached from the housing 160 and replaced with other modules similar to module 148. For convenience, the detachable module 148 may comprise a subscriber identity module (SIM) card. The other modules, in accordance with the present invention, contain transceivers operable according to different modes, such as different communication protocols or on different frequency bands.

The detachable module 148 allows a user of the communication device 102 to tailor the components of the communication device 102 to the anticipated communication systems the user will encounter. As one example, the second transceiver 126 in the detachable module 148 may be selected to provide service on the particular systems the user will encounter. For example, for travel in Europe, the user would select a GSM module as module 148. For travel in the United States, the user would select an IS-95 module. Additionally, the first transceiver 124 may be a transceiver for use on a satellite radiotelephone system, such as an Iridium system. The first transceiver 124 (in the illustrated embodiment) is not detachable, and satellite service provides globally available service as a backup when local service through detachable module 148 is not available.

When more than one communication system is available, the communication device 102 must prioritize its use of the communication systems. Priority may be based on a number of factors, such as system cost, a specified home system, desirability of roaming, etc. The controller 136 analyzes system availability and prioritizes system access, as will be described in greater detail below.

Figure 2:
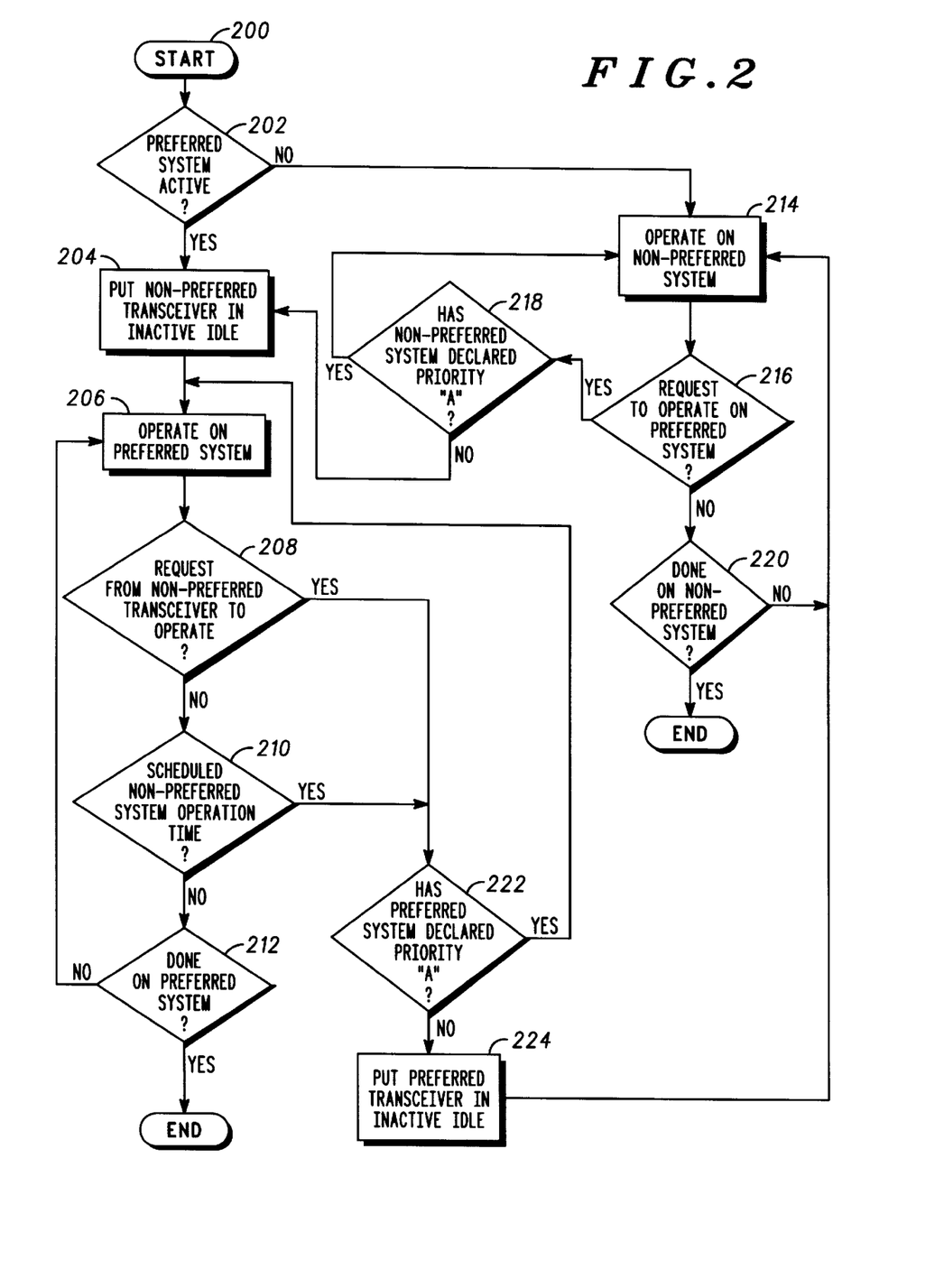
FIG. 2 is a flow diagram illustrating operation of the communication device of FIG. 1.

FIG. 2 shows a flow diagram illustrating operation of the communication device 102 of FIG. 1. In the flow diagram of FIG. 2, it is assumed that one of the plurality of communication systems serving the geographical location of the communication device 102 is a preferred system and that others are non-preferred systems. A system may be preferred for any reason, including cost of access, quality of service or availability of service features. It is further assumed that the communication device 102 defines a priority A and a priority B. Priority A applies when a communication circuit such as first transceiver 124 or second transceiver 126 is actively using the shared resources of the communication device 102 and cannot be interrupted. Priority B applies when a communication circuit would like to use the shared resources but can be interrupted at any time.

The method begins at step 200. At step 202, the communication device 102 determines if the preferred system is active. This may be achieved, for example, by attempting to receive control channels broadcast by base stations in the preferred system. If the preferred system is not active, control proceeds to step 214. If the preferred system is active, at step 204, the communication device 102 puts the transceiver for the non-preferred system in an inactive idle state. In inactive idle, the transceiver is prevented from using the shared resources. At step 206, the communication device 102 establishes communication on a first communication system, the preferred system, using a first communication circuit, such as the first transceiver, and a shared communication resource of the communication device.

Beginning at step 208, the communication device looks for interrupts to operation on the preferred system to begin operation on a non-preferred system. At step 208, the communication device 102 checks for a request from the transceiver for the non-preferred system to operate. If such a request has been received, control moves to step 222. If no such request has been received, at step 210, the communication device 102 determines if a scheduled operation time for the non-preferred system has arrived. Examples of scheduled operation times are the assigned time slots used in time division multiple access (TDMA) communication systems and slotted paging mode specified for IS-95 CDMA systems. Thus, the communication device 102 detects a request to communicate on a second communication system such as the non-preferred system, the second communication system being autonomous from the first communication system. If no such time has arrived, at step 212, the communication device 102 determines if communication on the preferred system is complete. If so, operation ends. If not, operation returns to step 206.

If, at step 208 or step 210, the communication device detected an interrupt condition requesting transfer to the non-preferred system, at step 222, the communication device determines if priority A has been requested by the preferred system. If so, communication on the preferred system cannot be interrupted and the request to operate on the non-preferred system must be deferred. If priority A has not been requested, at step 224 the communication device 102 inactivates the first communication with the preferred system. The transceiver for the preferred system is put in the inactive idle state and control is transferred to step 214. The communication device 102 establishes second communication on the second communication system using a second communication circuit and the shared communication resource of the communication device. The communication device 102 begins operating on the non-preferred system.

At step 216, during operation on the non-preferred system, the communication device 102 determines if there has been a request to operate on the preferred system. Such a request could also correspond to a scheduled operation time for the preferred system, such as a preassigned time slot or slotted paging mode slot. In response to this interrupt, at step 218, the communication device 102 determines if the transceiver for the non-preferred system has requested priority A. If so, communication on the non-preferred system cannot be interrupted and the request to operate on the preferred system must be deferred. Control returns to step 214. If priority A has not been selected, control proceeds to step 204. If, at step 216, no request to operate on the preferred system had been received, control continues at step 220 where the communication device 102 determines if communication on the non-preferred system is complete. If so, the process ends. If not, control returns to step 214 for further communication on the non-preferred system.

It will be recognized that operation can be varied by varying the prioritization of the communication systems and by defining priority A and other priorities. For example, additional preferred systems may be defined, along with priorities such as First Preferred system and Second Preferred system. Alternatively, a Priority C (and other Priorities) can be defined to control the access to other systems.

Figure 3:
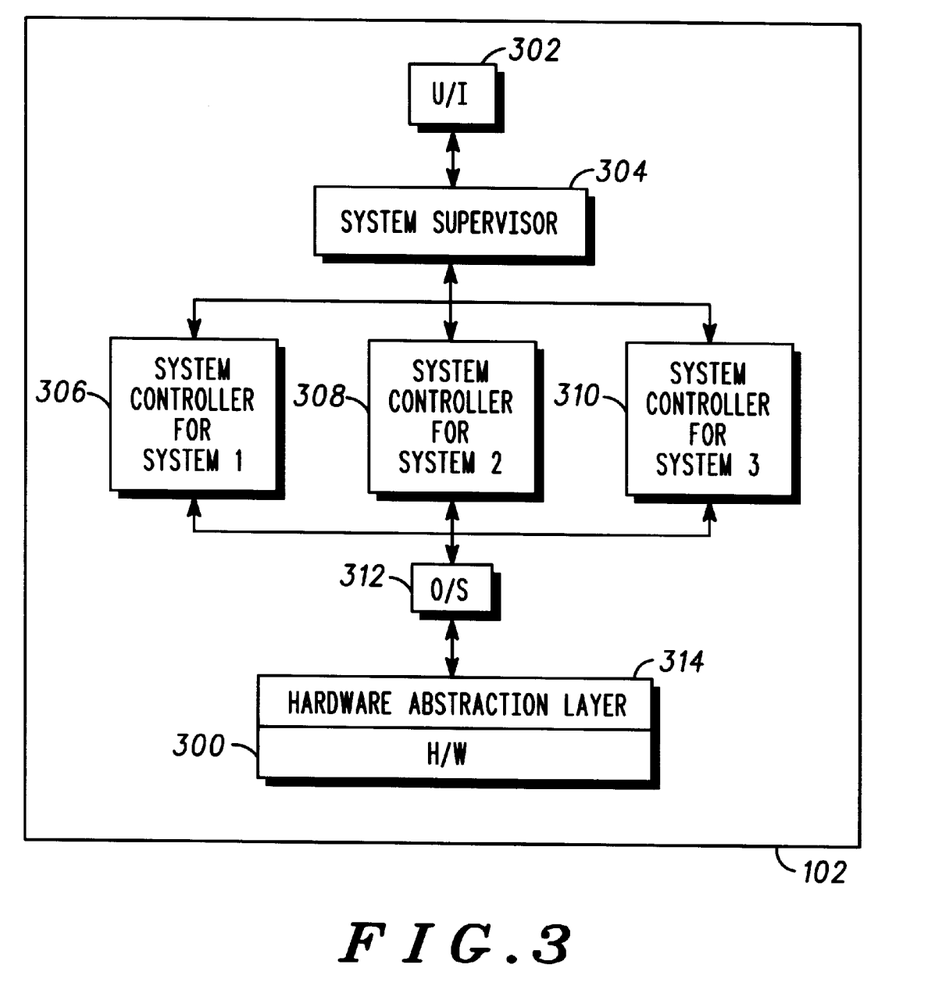
FIG. 3 is a block diagram of the communication device of FIG. 1.

FIG. 3 shows an alternative block diagram of the communication device 102 of FIG. 1. FIG. 3 is arranged to show differing functional control blocks of the communication device. As illustrated in FIG. 3, the communication device 102 includes hardware 300, a user interface 302, a system supervisor 304, a plurality of system controllers including a first system controller 306, a second system controller 308 and a third system controller 310, and an operating system 312. The communication device 102 also includes a hardware abstraction layer 314. In the illustrated embodiment, the user interface 302, the system supervisor 304, the first system controller 306, the second system controller 308, the third system controller 310, the operating system 312 and the hardware abstraction layer 314 all represent program instructions for controlling a single microcontroller, such as controller 136, of the communication device 102. The hardware 300 represents all the hardware components of the communication device 102, including the controller 136, the first transceiver 124 and second transceiver 126, the synthesizer 132, battery 142 and hardware for user interface 138.

The user interface 302 corresponds to instructions for controlling the user interface hardware (keypad, display, etc.) of the communication device 102. For example, the user interface 302 recognizes presses of the keypad as indicating a user entering a phone number to call or retrieving a voice mail message. In other examples, the user interface 302 interprets messages received from a communication system. These messages include a "ring" signal, causing the user interface 302 to produce an alert to the user of an incoming call, or a short text message, causing the user interface 302 to display the text on the display.

The system supervisor 304 provides priority control for accessing the different communication systems available to the communication device. The system supervisor 304 arbitrates usage of the shared resources of the communication device 102. For example, the system supervisor determines if the communication device 102 is in a call on one communication system and, if so, prevents interruption by another system. The system supervisor 304 coordinates the plurality of system controllers for multimode operation of the communication device 102.

The first system controller 306, the second system controller 308 and the third system controller 310 form a plurality of system controllers, each system controller controlling the transceiver of the communication device 102 in communication with one or more respective remote transceivers in an autonomous communication system. The first system controller 306, the second system controller 308 and the third system controller 310 are the program instructions necessary for implementing the communications protocol defined for each of a first, second and third communication system. More or fewer system controllers may be used as required. In one example, the first system controller 306 corresponds to the protocol for a satellite communication system, such as the Iridium system, the second system controller 308 corresponds to the protocol for a GSM system, and the third system controller 310 corresponds to the protocol for an IS-136 system. When the communication device 102 attempts to communicate with any one of these systems, the system supervisor 304 activates the appropriate system controller to control the hardware 300 of the communication device 102.

The operating system 312 is the operating system of the microcontroller which controls the operation of the communication device 102. For example, if the microcontroller is a 68HC11 microcontroller, available from Motorola, Inc., Schaumburg, Ill., the operating system 312 is the instruction set of the 68HC11 microcontroller.

The hardware abstraction layer 314 corresponds to the data and instructions needed to operate the specific hardware components of the hardware 300. For example, the hardware abstraction layer 314 defines the counter values necessary for implementing the synthesizer 132 (FIG. 1) at the frequency of interest for the communication systems defined by the system controllers.

Figure 4:
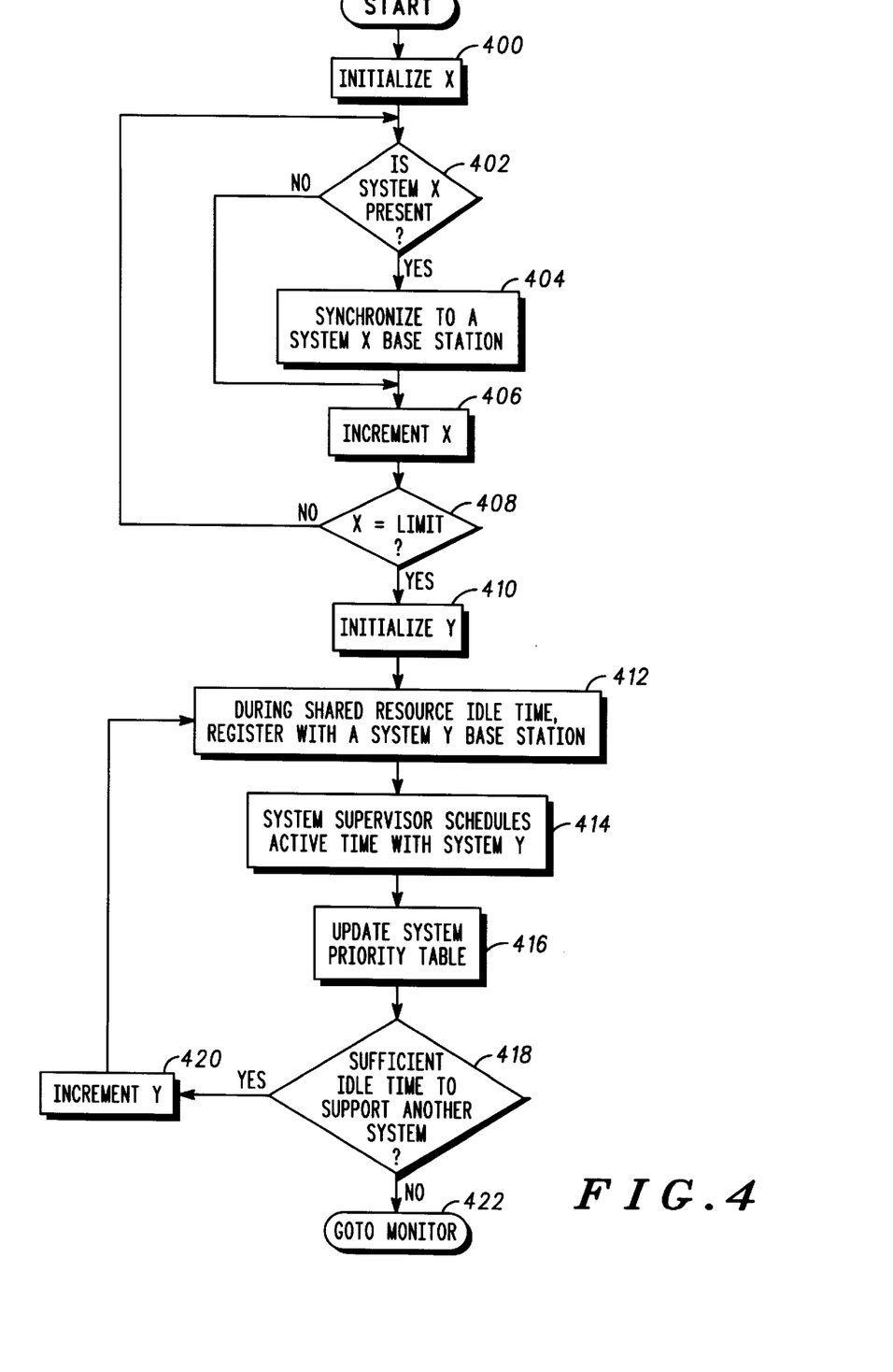
FIG. 4 is a flow diagram illustrating operation of the communication device of FIG. 3.

FIG. 4 shows a method for operating the communication device of FIG. 3 in conjunction with a plurality of autonomous communication systems. FIG. 4 illustrates operation of the communication device to locate all available communication systems with which the communication device can communicate (using its first, second and shared resources) and registering with as many of those systems as possible. Since many exchanges between a base station and a mobile station are periodic (i.e., control signals and time slots), the communication device must divide up its total active time between these periodic exchanges and other planned communications until a call is initiated.

In FIG. 4, the communication device 102 initially determines which systems of the plurality of autonomous communication systems are active. At step 400, a variable x is initialized and at step 402, the communication device 102 determines if system x is present and active. This is done, for example, by searching for control channels defined by system x, or by locating a pilot signal (in an IS-95 CDMA system). If system x is present, the communication device 102 synchronizes to a base station of system x by any known method and, in step 406 increments the variable x. If no system x was located, the variable x is incremented. At step 408, x is compared to a limit. If the limit is not reached, control returns to step 402 to search for additional systems. If the limit is reached, control proceeds to step 410. It will be understood that other looping controls besides use of a variable may be used when searching for all available systems.

After locating systems, the communication device 102 registers with as many active communication systems as possible. At step 410, a variable y is initialized. The variable y corresponds to active communication systems identified in steps 400–408. At step 412, the communication device registers with system y. Preferably, this is done during idle time on other systems, when shared resources of the communication device 102 are available. For example, if the communication device 102 is currently communicating with a TDMA communication system, registration with a new system y occurs during a time slot of the TDMA system not assigned to the communication device, when the shared resources may be reassigned for the registration process.

Registration generally comprises exchange of identification information between a mobile station such as the communication device and the communication system. Registration information is used by the communication system to locate and identify the mobile station. In order that calls may be efficiently routed to a particular mobile station, each mobile station generally registers its location with the nearest base station. An incoming call is then routed by the network controller to that base station which then establishes radio communication with the mobile station to complete the call.

At step 414, if necessary, the system supervisor 304 (FIG. 3) schedules active time with system y. The system supervisor 304 negotiates communication aspects for communication between the communication device and systems with which the communication device has registered. For example, if system y is a TDMA system, the system supervisor 304 negotiates time slots for communication between the communication device 102 and system y. Other communication aspects which might be negotiated include channel frequency. Negotiation is necessary because the communication device may have already registered with other systems and allocated portions of its communication resources or assets to those systems. In an alternative embodiment, the communication device's system controller for system y schedules time with the system supervisor, without the negotiation with system y itself, taking into account only the total active time of the communication device 102. This has the advantage of limiting communication with system y, reducing system traffic and conserving battery power of the communication device.

After the active time for system y is scheduled, at step 416 the system supervisor 304 updates a system priority table. The system priority table defines scheduled communication times and relative priorities among the plurality of communication systems. For example, if the communication device is configured to communicate on an Iridium system and a GSM system, the system supervisor 304 may establish a priority as follows:

If on the home GSM system, priority is
1. GSM
2. Iridium

If roaming on a GSM system, priority is
1. Iridium
2. GSM

The priority decision is informed by factors such as relative cost for air time, etc. Thus, the communication device 102 establishes a priority of registered systems for establishing communication.

At step 418, the communication device 102 determines if enough idle time remains in its total active time to support communication with another system. If so, at step 420 the variable y is incremented and another active system is accessed for registration. If not, the communication device begins monitoring registered systems for call activity.

Figure 5:
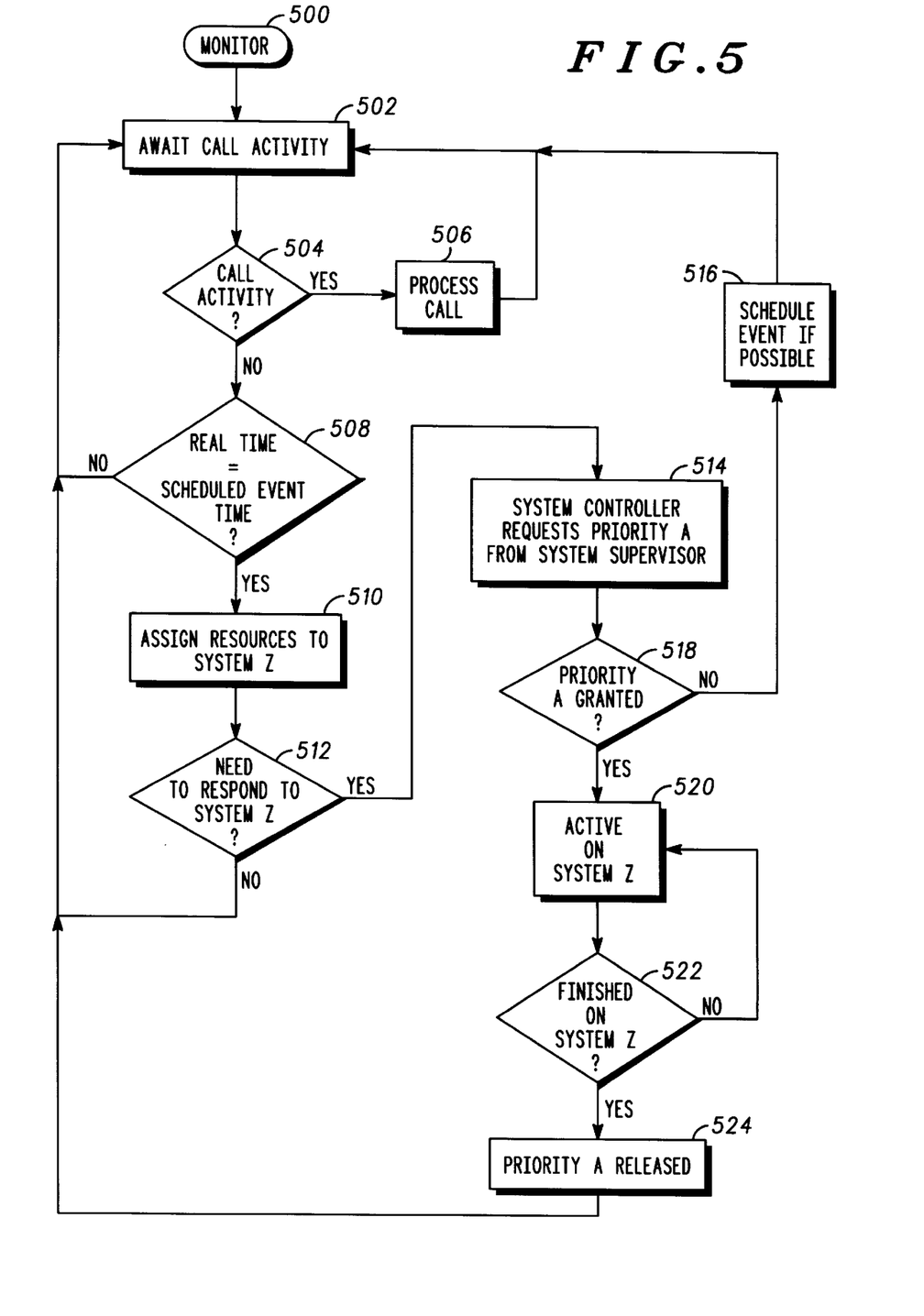
FIG. 5 is a flow diagram illustrating operation of the communication device of FIG. 3.

FIG. 5 is a flow diagram illustrating operation of the communication device 102 of FIG. 3. Monitoring for call activity begins at step 500. At step 502, the communication device awaits call activity. At step 504, the communication device determines if call activity has been detected. Call activity may be an incoming call activity indication received from a communication system or an attempt to initiate a call by a user pressing keys on a keypad. If call activity is detected, at step 506, the call is processed and control returns to step 502.

If no call activity is detected at step 504, the communication device 102 then determines if real time, as maintained by its on-board clock, matches a scheduled event time. A scheduled event time corresponds, for example, to an assigned time slot on a registered communication system, or a time to attempt registration with a system. Scheduled event times are times when the communication device 102 is scheduled to communicate with one of the plurality of communication systems. If it is not presently a scheduled event time, control returns to step 502.

If real time does correspond to a scheduled event time, at step 510, the communication device 102 assigns shared resources to communication with the system of interest, designated in FIG. 5 as system z. At step 512, the communication device 102 determines if it needs to respond to system z. No response may be necessary, for example, if the scheduled event corresponded to a receive time slot and the receive time slot did not indicate an incoming call for the communication device. If the receive time slot contained only control or synchronization information, the communication device 102 does not need to respond and so may de-assign the shared resources and control returns to step 502.

If the communication device 102 does need to respond, then at step 514 the system controller (such as first system controller 306 in FIG. 3) requests priority A from the system supervisor 304 (FIG. 3). If priority A is not granted, step 518, the system supervisor 304 schedules the event requiring response, if possible, and control returns to step 502. If priority A is granted in step 518, the communication device 102 begins communicating on system z at step 520. Communication continues until complete, step 522. When communication is complete, priority A is released, step 524 and control returns to step 502.

Figure 6:
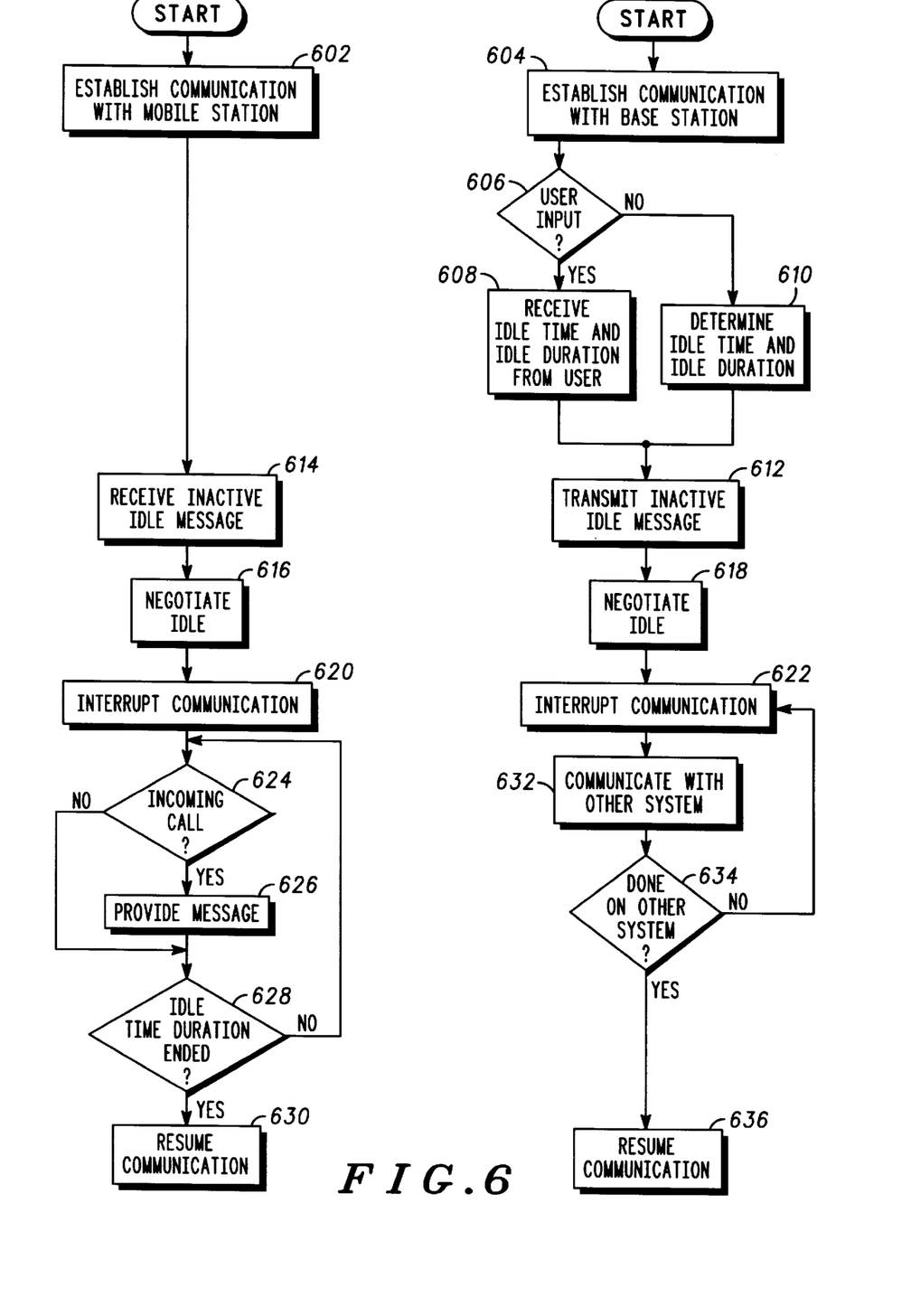
FIG. 6 is a flow diagram illustrating operation of a communication system and the communication device of FIG. 1.

FIG. 6 is a flow diagram illustrating operation of a communication system and the communication device of FIG. 1. FIG. 6 illustrates steps taken to enter and exit an inactive idle state at both the communication device and at a communication system. In FIG. 6, operation of the communication system (such as a base station in a terrestrial cellular system or a satellite transceiver in a satellite communication system) is illustrated on the left side and operation of the communication device (such as a multimode cellular telephone) is illustrated on the right side. At step 602, the communication system, communication is established between the communication system and the communication device. A similar step occurs at step 604 for the communication device.

In the illustrated embodiment, entry to inactive idle is initiated by the communication device. Provision is made for user entry to inactive idle or for the communication device to automatically determine entry time and duration. User entry may occur, for example, if a user knows he is about to begin an airplane flight and will be unreachable by any terrestrial system and even any satellite system. The user can define a idle initiation time and idle duration time to correspond to the flight's time. At step 606, the communication device checks for user input. If user input is present, at step 608 the communication device receives from the user the idle initiation time and the idle duration time. If no user data is provided, at step 610 the communication device determines the time to initiate the inactive idle state and the duration of the state. The communication device may do this, for example, in response to an impending time slot on another system. So that the communication device is ready to receive its time slot on the other system, it determines the time and the duration of the time slot. In an alternative embodiment, only the idle time duration, corresponding to the duration of the inactive idle state, is determined.

At step 612, an inactive idle message is transmitted from the communication device and, at step 614 the inactive idle message is received from the communication device at the communication system. The inactive idle message indicates that the communication device will be unavailable for a predetermined idle time duration. The inactive idle message may included any suitable information, including the inactive idle duration, the idle initiation time and a simple request to enter inactive idle.

At step 616 and step 618, the communication system and the communication device negotiate the parameters of the idle state. For example, if not previously specified, the negotiated parameters include inactive idle duration and idle initiation time. In an alternative embodiment, no negotiation occurs and the communication device dictates the parameters of the idle state.

At step 620, at the idle initiation time, the communication system interrupts communication with the communication device. At step 622 a similar procedure is executed by the communication device. In the communication system, the communication link may be kept active, for example, by not reassigning the communication link's time slot or by continuing to provide control and timing signals to the communication device. Alternately, to enhance system capacity, the communication resources such as time slot and frequency may be reassigned during the idle duration of the communication device.

One advantage of informing the communication system that the communication device will be in inactive idle mode is conservation of system resources. If the system knows the communication device is in inactive idle, the system does not waste resources, for example, trying to page the communication device with an incoming call. Thus, at step 624, the communication system determines if there is an incoming call intended for the communication system. If so, at step 626, the communication system provides an information message in response to the incoming call received during the predetermined idle time duration. In an alternative embodiment, part of the user information entered at step 606 could include the information to be provided in the information message. The information message may simply inform the caller of the user's unavailability or may direct the caller to leave a voice mail message or provide any other suitable message.

After providing the message, or if no incoming call was detected, at step 628, the communication system determines if the communication device's idle time duration has expired. If so, at step 630, following the predetermined idle time duration, the communication device resumes communication with the communication device.

At the communication device, after interrupting communication with the communication system, step 622, the communication device communicates with another communication system, step 632. If the communication device includes shared resources, the shared resources are reassigned from communication with the communication system to communication with the other communication system. This may include selecting a different frequency band, using a different communication protocol, etc.

Communication between the communication device and the other communication system may be previously scheduled or may be simply a test for incoming calls. For example, the communication device may receive a time slot having control information (possibly including a page identifying an incoming call) from the other system. Alternatively, the communication device may have detected the presence of the other system during a previous inactive idle state and now tries to register with the other system during the current inactive idle state.

At step 634, the communication device determines if it is time to exit the inactive idle state and return to communication with the communication system. In the illustrated embodiment, the communication device determines if communication on the other system has ended. In alternative embodiments, the communication device could check for the end of the idle time duration or for any other suitable condition. At step 636, the communication device resumes communication with the communication system.

As can be seen from the foregoing, the present invention provides a method and communication device for multi-mode communication with multiple autonomous communication systems. Individual resources are dedicated to communication on the respective communication systems. To minimize product cost, resources are shared wherever possible between communication on respective modes. A system supervisor prioritizes, schedules and controls communication between the communication device and the autonomous communication systems. Thus, the communication device can access multiple systems even when moved to different locations having different service types.

While a particular embodiment of the present invention has been shown and described, modifications may be made. It is therefore intended in the appended claims to cover all such changes and modifications which fall within the true spirit and scope of the invention.

What is claimed is:

1. A method for operating a communication device, the communication device operable on a plurality of communication systems, the method comprising the steps of:

establishing first communication on a first communication system by initiating a communication link between the communication device and the first communication system using a first communication circuit and a shared communication resource of the communication device;

detecting a request to communicate on a second communication system, the second communication system being autonomous from the first communication system;

inactivating the first communication circuit while maintaining the communication link; and establishing second communication on the second communication system using a second communication circuit and the shared communication resource of the communication device.

\* \* \* \* \*